9022X
G. Gay.
Silk Winding Mach.
Patented Aug. 17, 1835.
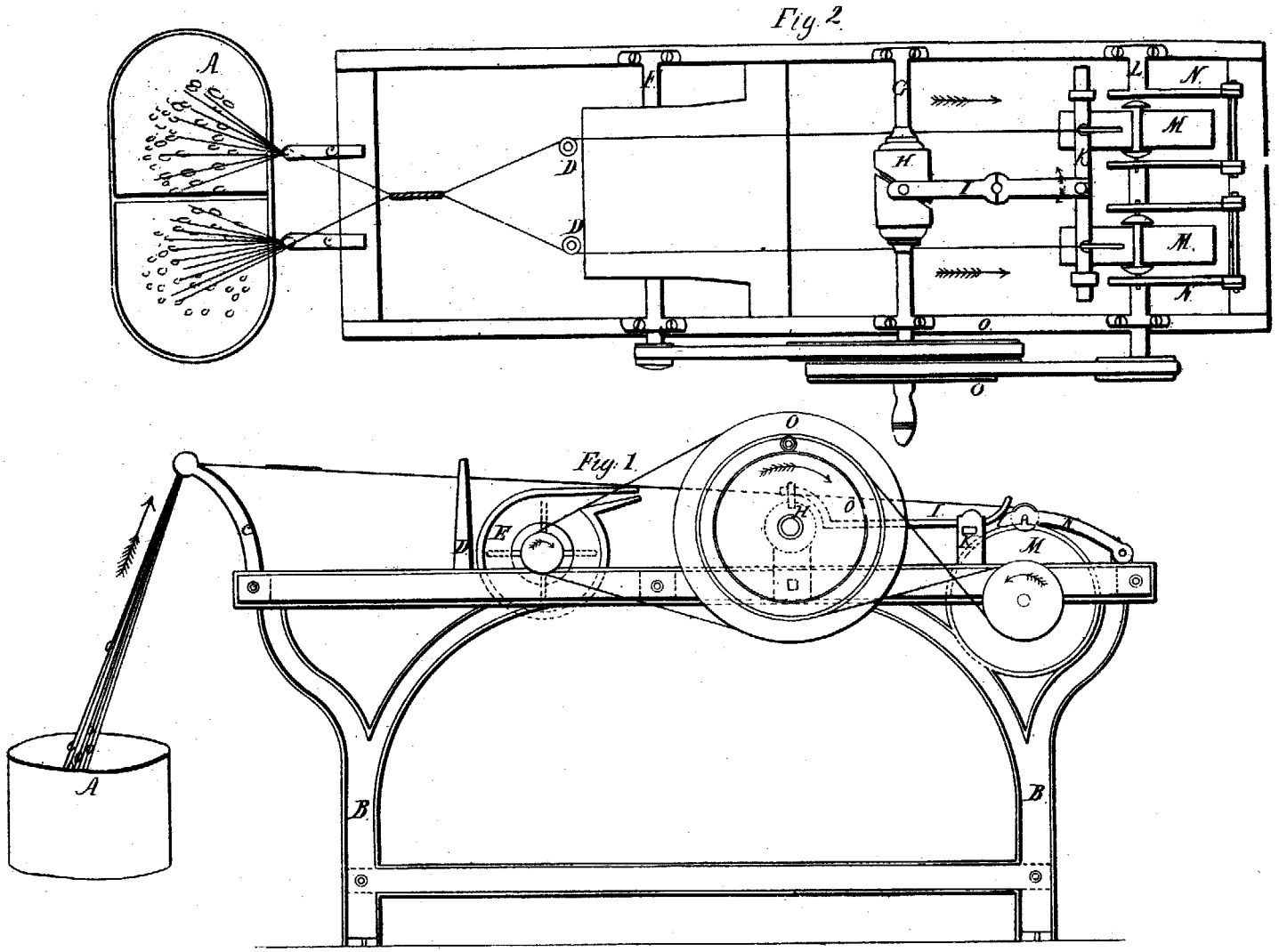

Aug. 17. 1835    9022X    69.

Gamaliel Gay. Poughkeepsie Dutchess Co. New York.

The Schedule referred to in these Letters Patent and making
part of the same, containing a description in the words of the said
Gamaliel Gay himself of his improvement in the process for the
unwinding of Silk from Cocoons and winding thereof upon spools
or bobbins, and also in the machinery by which the same is effected.

---

To all whom it may concern. Be it known that I Gamaliel Gay,
~~[illegible]~~ of Poughkeepsie, in the County
of Dutchess and State of New York, have invented an improvement in
the process for the unwinding of Silk from Cocoons and winding
thereof upon spools or bobbins, and also in the machinery by which the
same is effected. And I do hereby declare that the following is a full
and exact description of my said improvement.

The main object of my improvement is to take the silk im-
mediately from the Cocoons and instead of winding it into skeins
upon reels, as is usually done, to dispense with the reeling process
altogether, and wind it immediately upon spools, or bobbins of any
required description. The machinery which I use for this purpose
may be varied in form, but the general principle of its construction
and upon which I proceed will be fully exemplified by the accom-
panying drawing in which fig. 1. represents the elevation of such a
machine, and fig. 2. shews it in place. A, represents the pan or
reservoir of warm water in which the cocoons are immersed. B.B the
sides of the Frame attached to each other by suitable girths, or cross
pieces. C.C, are guides through which the silk passes. D.D. are studs
which serve to separate the two threads which are spooled at the same
time. E, is a blower or fan wheel within a case, constructed and
acting in a manner well known, and which serves to dry the fibres
of Silk as they are spooled. This fan wheel revolves on a shaft F.
being driven by a suitable whirl and strap, G. the main shaft car-
rying a cylindrical hub, H, which has a spiral groove around it, to receive a pin which passes through the end of the vibrating
lever. I, On the opposite end of this lever, there is a crotch or fork, thro'
which a pin or stud passes which is attached to and carries the slide
bar K. The vibrating lever I works upon a pin at or near its centre &
the groove in the hub, H, consequently communicates through its in-
=tervention a traversing motion to the bar, K. This bar has on it two
fingers or guides through which the silk passes to the spools by which
means it is laid even thereon, and the Threads are crossed in the
most advantageous manner. The shaft, L, carries two drums M, M,
on which the spools rest, and from which they receive their mo-
tion. A pan with cocoons may be placed at each end of the ma-
=chine, which in that case will be so lengthened out as to sustain
the necessary appendages for conducting the silk to the spools.
which additional spools may rest upon the same drums M, M,
already described, Stirrups N, N. or other similar contrivances
are used to guide and keep the spools in their places. These Stirrups
I hang on centres at their outer ends to allow them to rise with the
increase of silk on the spools. OO. are driving pullies connected
to the requisite whirls. This machine may be turned by hand or
otherwise. I have thus described a machine which has been found
fully to answer the intended purpose, and in so doing I have refer
-red to many parts which are not claimed as new, nor indeed
do I intend to claim as my invention either of these parts in their
individual capacities or to confine myself to the exact mode of combi-
=ning them as herein represented. But I do hereby claim the winding
of the silk from the cocoons directly onto spools, without the interme-
=diate process of reeling, and also that arrangement of the winding ma-
chinery by which the same is, or may be effected, acting substantially
as herein set forth.

Witnesses
Saml Stettinius
Jno Wells

Gamaliel Gay (7 44 words) (Patented 17th Augt 1835)
(Drawing)